United States Patent Office.

JOHN H. STEVENS, OF NEWARK, NEW JERSEY, ASSIGNOR TO THE CELLULOID COMPANY, OF NEW YORK, N. Y., A CORPORATION OF NEW JERSEY.

PYROXYLIN COMPOUND.

SPECIFICATION forming part of Letters Patent No. 614,514, dated November 22, 1898.

Application filed April 28, 1898. Serial No. 679,102. (No specimens.)

*To all whom it may concern:*

Be it known that I, JOHN H. STEVENS, of the city of Newark, county of Essex, and State of New Jersey, have invented certain new and useful Improvements in Pyroxylin Compounds, of which the following is a specification.

Pyroxylin is well known as the product resulting from the action of a mixture of nitric and sulfuric acids on cellulose fiber, especially in the form of cotton or paper. While pyroxylin is a neutral substance, the nitro elements contained in it cause it to be the subject of an acid decomposition. This decomposition extends also to its compounds with solvents. To prevent or minimize this decomposition and the deleterious effects arising therefrom, it has been more or less customary to combine the pyroxylin or its compounds with some antacid or neutralizing agent—like carbonate of magnesium or urea, for instance. The different effects require a large number of antacid substances to select from, and hence any addition to those already known is welcome to the operator. I find that chloracetate of magnesium is a useful antacid substance and can be combined or mixed with pyroxylin and its compounds with solvents, so as to retard or prevent the decomposition referred to. It is soluble in alcoholic solvents and also in water, and can be combined with the pyroxylin by means of water, or when solvents are used it can be dissolved in wood-spirit or in grain-alcohol and then added to the mixture, or it can be intimately combined with the mixture by grinding or masticating operations. The magnesium chloracetate does not interfere with the transparency of these mixtures, and therefore can be used in making the transparent pyroxylin compounds used in the arts. After adding it to the pyroxylin in aqueous solution I dry out the water, which leaves the pyroxylin protected, although it is understood that the pyroxylin still possesses its other properties, such as explosiveness and inflammability. As to proportions, I find that two per cent. of the salt, by weight, to the pyroxylin is a very good proportion. Obviously I do not confine myself to any definite proportion.

Magnesium chloracetate belongs to a class of substances known as the "salts of the halogen acids," derived from the monatomic series of volatile fatty acids. These acids are chloracetic, bromacetic, chlorpropionic, &c. I find that this entire series of salts possess more or less antacid power, according to the nature of the acid and the base in combination with the acid, and especially according to the solubility of the salt, more particularly with respect to its solubility in alcoholic solvents. I also find that practically the salts containing the bromin elements are much inferior to those which contain the chlorin elements, especially because of the tendency of the bromin elements to discolor pyroxylin compounds. Hence I recommend the operator to confine himself to the chlor compounds. The chloracetates are also preferable to the chlorformates, chlorpropionates, chlorbutyrates, and chlorvalerates. Chloracetate of lithium and chloracetate of zinc are also good antacid substances, and I have used them in the proportion specified for the magnesium salt in making transparent pyroxylin sheets and in imitation of clear tortoise-shell. Among the other salts of this series which I have used are the chloracetates of calcium, potassium, strontium, and sodium. These salts are not equal to the magnesium salt for the purpose, although they possess more or less antacid power. I prefer the magnesium salt above all, and next to that the lithium and zinc salts. The lithium and zinc salts give good transparency; but they do not seem to be as pale in color effects as the magnesium salt. They give very fair colors nevertheless. The other metallic salts mentioned are inclined to interfere with the transparency and ought to be confined to non-transparent compounds. I find that the salts of monochloracetic acid are preferable to those of the dichlor and trichlor acetic acids.

I am aware that in the older books on chemistry substances which are now considered as esters—for instance, chloracetate of amyl—were also known as salts; but esters will not act as antacids in my invention, and therefore my new group of antacid substances is confined to the salts of inorganic bases.

The art of manufacturing pyroxylin and its compounds is well understood, and no further description is needed in order to inform the operator. He will appreciate the novelty and usefulness of my invention.

Having fully described my invention, what I claim, and desire to secure by Letters Patent, is—

1. A pyroxylin composition of matter consisting of pyroxylin and an inorganic salt of a halogen acid derived from the volatile members of the monatomic series of fatty acids, substantially as described.

2. A pyroxylin composition of matter consisting of pyroxylin, a solvent of the same, and an inorganic salt of a halogen acid derived from the volatile members of the monatomic series of fatty acids, substantially as described.

3. A pyroxylin composition of matter consisting of pyroxylin and an inorganic salt of chloracetic acid, substantially as described.

JOHN H. STEVENS.

Witnesses:
WALTER P. LINDSEY,
S. M. COOLEY.